United States Patent [19]

Tury

[11] Patent Number: 4,814,010

[45] Date of Patent: Mar. 21, 1989

[54] CORROSION INHIBITION

[75] Inventor: Bernard Tury, Prestwich, United Kingdom

[73] Assignee: Imperial Chemical Industries PLC, London, England

[21] Appl. No.: 145,817

[22] Filed: Jan. 19, 1988

[30] Foreign Application Priority Data

Jan. 27, 1987 [GB] United Kingdom ............... 8701705

[51] Int. Cl.$^4$ .................. C23F 11/10; C08G 63/68
[52] U.S. Cl. ................. 106/14.31; 106/14.26; 106/14.27; 106/14.42; 106/14.41; 528/360; 560/155; 560/179; 422/8; 427/384; 252/389.21; 252/389.22; 252/392
[58] Field of Search ............... 106/14.22, 14.23, 14.24, 106/14.26, 14.27, 14.31, 14.34, 14.35, 14.37, 14.38, 14.41, 14.42, 14.43; 427/384; 528/360; 560/155, 179; 422/8; 252/389.21, 389.22, 392

[56] References Cited

U.S. PATENT DOCUMENTS

| | | | |
|---|---|---|---|
| 3,415,766 | 12/1968 | Jedlicka | 106/14.24 |
| 3,574,566 | 4/1971 | Dwors | 428/624 |
| 3,778,287 | 12/1973 | Stansfield et al. | 106/308 Q |
| 3,974,083 | 8/1976 | Suen et al. | 252/389.22 |
| 4,224,212 | 9/1980 | Topham | 106/20 |

FOREIGN PATENT DOCUMENTS

| | | |
|---|---|---|
| 0125025 | 11/1984 | European Pat. Off. . |
| 0127325 | 12/1984 | European Pat. Off. . |
| 0206716 | 12/1986 | European Pat. Off. . |
| 650118 | 2/1951 | United Kingdom . |
| 1373660 | 11/1974 | United Kingdom . |

OTHER PUBLICATIONS

European Patent Office Search Report S.34189/EP.

Primary Examiner—Paul Lieberman
Assistant Examiner—Helene Kirschner
Attorney, Agent, or Firm—Cushman, Darby & Cushman

[57] ABSTRACT

A method for the inhibition of corrosion of metals involves treatment of the metal surface with a polyester having a functional terminal group such as an amine. The polyester may be used together with other corrosion inhibitors, a useful combination being the polyester together with a hydroxy-oxime. The corrosion inhibiting material may be incorporated into a surface coating composition such as paint which is then applied to the metal surface.

13 Claims, No Drawings

CORROSION INHIBITION

The present invention relates to a process for the inhibition of the corrosion of metals and also to compositions which have corrosion inhibiting properties.

British Patent Specification No. 812149 discloses a rust-preventive composition comprising a petroleum-based hydrophobic film-forming agent in which is dissolved from 0.2 up to 10% by weight of an oil-soluble fatty acid amide of an aliphatic diamine. The preferred amide is the reaction product of equimolar proportions of oleic acid and ethylene diamine.

In our European Patent Application Publication No. 0125025 we disclose a process for the inhibition of the corrosion of metals which comprises treating the metal with an optionally substituted 2-hydroxy-5-alkylbenzaldoxime wherein the 5-alkyl substituent contains from 7 to 13 carbon atoms. The 5-alkyl substituents may be linear or branched, saturated or unsaturated. Branched alkyl groups are especially preferred. As optional substituents X in the benzene ring of the 2-hydroxy-5-alkylbenzaldoxime there are mentioned for example alkyl, aryl, alkoxy and aralkyl groups and more preferably halogen or nitro groups. Examples of such benzaldoximes include 5-nonyl-2-hydroxybenzaldoxime, 5-dodecyl-2-hydroxybenzaldoxime and 5-nonyl-3-bromo-2-hydroxybenzaldoxime.

In our European Patent Application Publication No. 0178850 we disclose a process for the inhibition of the corrosion of metals which comprises treating the metal with a bis(oximinomethyl)alkyl phenol, for example 2,6-bis(oximinomethyl)-4-nonylphenol. Metal complexes of hydroxyoximes, and the use of such complexes for corrosion inhibition, are described in our European Patent Application Publication No. 0206716. The use of catechol and derivatives thereof to protect metals against corrosion is disclosed, inter alia, in Chemical Abstracts, Vol. 99 (1983) abstract No. 162443t; GB No. 676632; U.S. Pat. No. 2,429,905 and our non-prepublished European Patent Application Publication No. 0239288. The use of a mixture of materials to provide a corrosion inhibiting effect is disclosed in our non-prepublished European Patent Application Publication No. 0247728 which discloses the use of a mixture of a substituted cyclic anhydride and a hydroxyoxime, for example a mixture of polyisobutenyl succinic anhydride and 2-hydroxy-5-nonylbenzaldoxime.

We have now found certain polyester derivatives have useful corrosion inhibition properties for a variety of metals.

According to the present invention there is provided a process for the inhibition of corrosion of metals by the treatment of a metal surface with a compound of the formula:

or

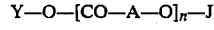

wherein
A is a divalent hydrocarbon radical;
Y is a hydrogen atom or an optionally substituted hydrocarbon group;
n is an integer from 1 to 100;
Z is a divalent bridging group;
R is either (i) an amino group or the salt thereof with an acid or (ii) sulphonate, phosphonate, sulphate or phosphate in the free acid form or as a metal or ammonium salt; and
J is phosphonate or sulphonate in the free acid form or as a metal or ammonium salt.

The group Y is typically an optionally substituted alkyl, alkenyl, aryl, alkaryl, aralkyl or cycloalkyl group, especially an optionally substituted alkyl group containing up to 25 carbon atoms. The group Y may be substituted and the substituents are preferably ones which do not confer water solubility on the molecule, such as halogen atoms, hydroxy, amino or alkoxy groups. Examples of such groups are dodecanoyl, hexadecanoyl, octadecanoyl or 9-octadecenoyl groups.

The divalent hydrocarbon group represented by A may be an aromatic group but is preferably an alkylene or alkenylene group, especially one containing from 4 to 25 carbon atoms with at least 4 carbon atoms between the oxygen atom and carbonyl group. Typically n has a value of at least two. When n is greater than one, the groups represented by A in the polyester chain $[O-A-CO]_n$ may be the same or different. It is generally preferred that n is from 1 to 10 when the group A is an aliphatic chain containing nine or more carbon atoms and n is from 1 to 60 when the group A is an aliphatic chain containing up to eight carbon atoms. The groups represented by A may carry other substituents which do not confer water-solubility on the molecule, such as halogen and alkoxy. Examples of suitable groups A are those present in poly(12-hydroxyoctadecanoyl), poly(12-hydroxy-9-octadecenoyl) and poly(6-hydroxyhexanoyl) chains.

The polyester residue of the formula:

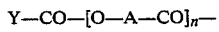

is conveniently derived from a mixture of (i) a saturated or unsaturated aliphatic hydroxycarboxylic acid containing from 4 to 25 carbon atoms having at least 4 carbon atoms between the hydroxy and carboxyl groups or a cyclic precursor thereof, such as a lactone and (ii) an aliphatic carboxylic acid of the formula Y—COOH, where Y is as hereinbefore defined. Examples of suitable hydroxycarboxylic acids and precursors are 12-hydroxyoctadecanoic acid, 12-hydroxy-9-octadecenoic acid, 6-hydroxyhexanoic acid and caprolactone. Examples of suitable acids from which the end group Y—CO— is derivable, by reaction with a terminal hydroxy group on the polyester chain, are dodecanoic acid, hexadecanoic acid, octadecanoic acid and 9-octadecenoic acid and mixtures containing these acids which are derivable from natural products.

The polyester residue of the formula:

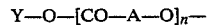

is conveniently derived from a mixture of (i) a saturated or unsaturated aliphatic hydroxycarboxylic acid containing from 4 to 25 carbon atoms having at least 4 carbon atoms between the hydroxy and carboxyl groups or a cyclic precursor thereof, such as a lactone and (ii) an aliphatic alcohol of the formula Y—OH, where Y is as hereinbefore defined. Examples of suitable hydroxycarboxylic acids and precursors are 12-hydroxyoctadecanoic acid, 12-hydroxy-9-octadecenoic acid, 6-hydroxyhexanoic acid and caprolactone. Examples of suitable alcohols from which the end group Y—O— is derivable, by reaction with a terminal carboxylate group on the polyester chain are decanol, dodecanol, hexadecanol, octadecanol and oleyl alcohol.

In Formula I above, the bridging group, Z, is preferably of the formula:

—NQ—L— or —O—L— wherein Q is a hydrogen atom or an alkyl group; and L is an alkylene or hydroxyalkylene group, or N, Q and L, together with the nitrogen atom in the group R to which they are attached form a cycloaliphatic bridging group. The group Q preferably contains up to 25 carbon atoms. The alkylene group which is, or which is present in, the group L preferably contains from 2 to 6 carbon atoms. Examples of the group represented by Q are methyl, ethyl, n-propyl, n-butyl and octadecyl and of the group represented by L are —$(CH_2)_2$—, —$(CH_2)_3$—, —$(CH_2)_4$—, —$(CH_2)_6$—, and —$CH_2$—CHOH—$CH_2$— and an example of the cycloaliphatic bridging group is piperazin-1,4-ylene.

The amino group represented by R may be a primary, secondary or tertiary amino group or a substituted ammonium group and is preferably of the formula:

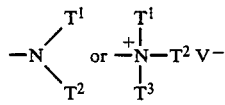

wherein $T^1$, $T^2$ and $T^3$ are each, independently, a hydrogen atom or an alkyl or cycloalkyl group which may be substituted by non-polar groups; and $V^-$ is an anion.

Examples of the groups represented by $T^1$ to $T^3$ are methyl, ethyl, n-propyl, n-butyl, octadecyl, 2-hydroxyethyl and cyclohexyl. The anion, $V^-$, can be from any inorganic acid or coloured or colourless organic acid, such as HCl, $H_2SO_4$, $CH_3COOH$, $C_2H_5COOH$, HCOOH, $CH_3OSO_3H$, $CH_3SO_3H$, $C_6H_5SO_3H$, $C_6H_5COOH$.

When R represents sulphonate, phosphonate, sulphate or phosphate, in the free acid form or as a metal or ammonium salt, or J represents sulphonate or phosphonate, the cation which is present may be a hydrogen ion, a metal ion, an ammonium ion or a substituted ammonium ion. Suitable cations include $H^+$, $Na^+$, $Ca^{2+}$, $NH_4^+$, $N(CH_3)_4^+$ and $NH(CH_3)_3^+$.

The compounds of Formulae I and Ia can be prepared by processes analogous to those described in UK Pat. Nos. 1342746, 1373660 and 2001083 and EP No. 127325 (with omission of the epoxidation).

For convenience hereafter, a compound of Formula I or Formula Ia will be referred to as a "polyester derivative".

The polyester derivative may be used in admixture with at least one unmodified polyester of the same general type. More specifically, the unmodified polyester is a compound of the general formula:

Y—CO—[O—A—CO]$_n$—OH     III or

Y—O—[CO—A—O]$_n$—H     IIIa where A, Y and n are all as hereinbefore defined. Such mixtures are conveniently obtained by reaction of a compound of Formula III or Formula IIIa with less than the stoichiometric quantity of the reagent, for example a diamine, necessary to convert the unmodified polyester into the desired polyester derivative. It is generally more convenient to prepare such mixtures and we have obtained improved corrosion resistance using such mixtures.

Thus, as a further aspect of the present invention a metal surface is treated with a composition which is a mixture of (A) a compound of Formulae I or Ia together with (B) a corresponding compound of Formulae III or IIIa. The mixture of (A) and (B) may contain the two components in molar proportions of from 10:90 to 90:10 but in general contains essentially equimolar proportions of (A) and (B), for example in the range from 60:40 to 40:60.

A suitable corrosion inhibitor is the product of reacting poly(12-hydroxyoctadecanoic acid) with a diamine such as, for example, an alpha-amino-omega-dialkylaminoalkane. We have obtained useful results with the product of reacting poly(12-hydroxyoctadecanoic acid) with 1-amino-3-(N,N-dimethylamino)propane in the relative molar proportions of approximately 2:1. The quaternary ammonium derivative of the foregoing material may also be used, for example the product of post reacting the foregoing mixture with dimethyl sulphate.

The process of the present invention is especially suitable for the corrosion inhibition of iron, zinc, copper, tin and aluminium and in particular mild steel and the zinc surface of galvanised steel.

The metal may be treated directly with the polyester derivative although it is generally preferred to apply the polyester derivative to the metal surface in the form of a solution in a suitable organic solvent or as an aqueous emulsion of the polyester derivative or as an aqueous emulsion of a solution of the polyester derivative in an organic solvent. The polyester derivative may be used to provide a protective coating in its own right or as a metal pre-treatment before the application of a surface coating. Alternatively, the polyester derivative may be incorporated into a surface coating composition which may be a natural oil or grease derived from animals or plants, such as for example, lanolin or rape seed oil. The polyester derivative may be employed as an additive to petroleum refined products such as lubricating oils, turbine oils, fuel oils and gasohols or greases, which are used in contact with metal surfaces.

Conventional organic solvents may be used for the polyester derivative and include for example aliphatic and aromatic hydrocarbons and higher alcohols, ethers and ketones. By "higher" is meant a group containing at least five, and preferably at least eight, carbon atoms. Especially preferred solvents are those having good wetting and drying properties and include for example toluene, xylene, chloroform, 1,1,1-trichloroethane, and octanol.

Aqueous emulsions of the polyester derivative may be formed in conventional manner using conventional dispersants and surfactants, including non-ionic dispersants. It may be convenient to treat the metal with an aqueous emulsion of the polyester derivative. Liquid or paste polyester derivatives which can be formed directly into an emulsion may be used.

The process of the present invention may provide corrosion inhibition either without the application of a further surface coating or as a pre-treatment before the application of a further surface coating. Thus the treatment may be used for example as a temporary protection whilst the metal is being transferred from one site to another. Thus the process of the present invention may be used for the temporary protection of a metal surface and the protective coating, which may be an oil or grease containing the polyester, subsequently dissolved before or during further processing.

Alternatively, the polyester derivative may be formulated in a surface coating composition intended to give extended protection of the metal surface such as, for example, a paint (primer) such as an air-drying, oil-modified system or a system including a chlorinated rubber, lacquer, resin or other protective coating. The surface coating may be a solvent-based composition, for example a cellulose/solvent based primer paint such as those used for car "touch up" paints. The polyester derivative is soluble in solvents generally used for such primers (for example nitrocellulose) and may be incorporated directly. The polyester derivative may also be used as an emulsion in aqueous emulsion surface coating systems, for example primers or protective coatings based on polymer latices such as for example acrylic and styrene/acrylic latices and vinyl acrylic copolymer latices including acrylate modified vinyl chloride—vinylidene chloride copolymer latices. The polyester derivative may also for example be incorporated in temporary alkali-removable protective coatings (whether solvent-based or emulsion based) of the addition polymer type in which the polymer contains carboxyl groups.

The polyester derivative or the solution or emulsion thereof may be applied to the metal in conventional manner, for example by dipping, spraying or brushing. The temperature of the application may be from 0° to 50° C. Typically, solutions of the polyester derivative may contain from 0.1 to 20% by weight of polyester derivative, whilst emulsions preferably contain from 0.1 to 5% by weight of polyester derivative. The presence of from 0.1 to 2% by weight of the polyester derivative in a surface coating emulsion formulation is generally sufficient to provide improved corrosion inhibition.

The polyester derivative, or mixture thereof with at least one unmodified polyester, may be used alone as corrosion inhibitors. However, the polyester derivative may be used together with other, known, corrosion inhibitors.

In particular we have obtained useful results when a polyester derivative is used together with a hydroxy-oxime, particularly one containing the moiety

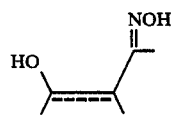

More specifically, the hydroxy-oxime is a compound of the general formula:

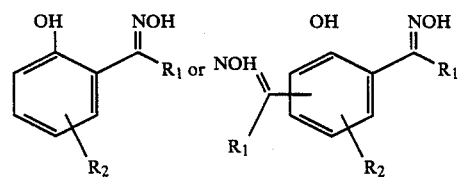

where
R$_1$ is a hydrogen atom or a substituted or unsubstituted hydrocarbon group; and
R$_2$ is a substituted or unsubstituted hydrocarbon group in which the hydrocabon group contains from 7 to 22 carbon atoms.

The group R$_1$ is preferably a hydrogen atom. In the bis-oxime compound, the second oxime group is preferably in the 6-position and particularly preferred compounds of this type are the 2,6-bis(oximinomethyl)-4-alkylphenols.

The group R$_2$ is preferably an alkyl group containing from 7 to 13 carbon atoms. The preferred mono-oximes are 2-hydroxy-5-alkylbenzaldoximes. The group R$_2$ may be a linear or branched, saturated or unsaturated group. Compounds in which R$_2$ is a branched alkyl group are particularly preferred. Suitable compounds of this type include 2-hydroxy-5-nonylbenzaldoxime and 2-hydroxy-5-dodecylbenzaldoxime. The hydroxy-oxime compounds may be used as a metal complex, as is described in more detail in EP No. 0206716.

The weight ratio of the polyester derivative, or mixture thereof with an unmodified polyester, to the hydroxy-oxime may be between 99:1 to 1:99 but will generally be from 10:1 to 1:10. However, the preferred proportions will be dependent on the particular compounds present in the mixture and we have found that certain mixtures appear to give a synergistic inhibition effect.

More specifically, when the polyester derivative is the product of reacting poly(12-hydroxyoctadecanoic acid) with 1-amino-3-(N,N-dimethylamino)propane in the relative molar proportions of approximately 2:1, and the hydroxy-oxime is 2-hydroxy-5-nonylbenzaldoxime, particularly useful effects are obtained when the weight ratio of the polyester reaction product to the hydroxy-oxime is in the range from 20:1 to 1:1, especially from 10:1 to 3:2.

The metal to be treated may be brightly polished and/or freshly cleaned. However, it is an advantageous feature of the process of the present invention that, when using a mixture of the polyester derivative and the hydroxyoxime, effective corrosion inhibition may be obtained even on a lightly rusted surface. Indeed, when using a mixture of the polyester derivative and the hydroxyoxime, we have found that better results are in general achieved when a surface is treated in an "as received" condition than when that same surface is freshly cleaned or brightly polished.

The process of the present invention may be combined with conventional corrosion inhibition treatments such as the phosphating of iron.

As indicated above, when using a mixture of the polyester derivative and the hydroxyoxime, the process of the present invention is equally effective on lightly rusted iron surfaces, and such a mixture may be used in this context as a "rust converter". We have found that using the mixture in the process of the present invention generally provides improved protection as compared with conventional "rust converters" based on tannic acid.

Various aspects of the present invention are set out in the following illustrative examples in which all parts and percentages are by weight unless otherwise stated.

EXAMPLE 1

Bright mild steel 2.5 cm×2.5 cm coupons were thoroughly washed with acetone followed by ethanol and stored in kerosene until required. Immediately prior to use they were washed with acetone. Test coupons prepared as above were immersed in 1% by weight solution of an additive in a liquid paraffin having a boiling point range of from 360° C. up to 390° C. After allowing to drain for about 18 hours, the treated coupons were transferred to distilled water at ambient temperature. After 7 days immersion in the distilled water, the coupons were removed, washed and dried. The coupons were weighed before and after the test. The additive used, and the weight loss due to corrosion are set out in Table 1.

TABLE 1

| Example or Comp. Ex. | Additive (a) | Weight loss (mg) |
|---|---|---|
| 1 | PED | 0.4 |
| A | BNSA | 6.3 |
| B | PIBSA | 6.3 |
| C | Nil | 12.3 |
| D | untreated | 15.9 |

Notes to Table 1
(a) PED is the polyester derivative obtained by the reaction of two mols of poly(12-hydroxyoctadecanoic acid) of molecular weight about 1600 (as determined by titration) with one mol of 1-amino-3-(N,N—dimethylamino)propane.
BNSA is the barium salt of di(nonyl)naphthalene sulphonic acid and is a commercially available corrosion inhibitor for use in oils, greases and the like.
PIBSA is a polyisobutenyl succinic anhydride of approximate molecular weight 1100.
Nil indicates that the coupon was treated with the liquid paraffin as supplied, with no further additive.
Untreated indicates that the coupon was tested without being subjected to a treatment with the liquid paraffin.

EXAMPLES 2 AND 3

The general procedure of Example 1 was repeated using different additives and with the following changes. The treatment was effected using a 10% by weight solution of the additive in 1,1,1-trichloroethane and allowing the treated coupons to dry for about 18 hours. The corrosion test was effected by immersing the coupons in 3% aqueous sodium chloride solution at ambient temperature for 5 days. Further details, and the results obtained, are given in Table 2.

TABLE 2

| Example or Comp. Ex. | Additive (a)(b) | Weight loss (mg) |
|---|---|---|
| 2 | PED | 1.7 |
| 3 | PEDS | 3.1 |
| E | untreated | 11.3 |

Notes to Table 2
(a) is as defined in Notes to Table 1.
(b) PEDS is the product of reacting PED with dimethylsulphate.

EXAMPLES 4 TO 6

The procedure of Examples 2 and 3 was repeated with the exception that different additives were used and the treatment was effected using a 20% by weight solution of the additive in a mixture of predominantly aliphatic hydrocarbons having a boiling point range of from 150° C. up to 200° C. Further details, and the results obtained, are given in Table 3.

TABLE 3

| Example or Comp. Ex. | Additive (a)(c) | Weight loss (mg) |
|---|---|---|
| F | BAO | 4.4 |
| 4 | PED | 7.4 |
| 5 | 3 PED/1 BAO | 2.0 |
| 6 | 7 PED/1 BAO | 1.5 |

TABLE 3-continued

| Example or Comp. Ex. | Additive (a)(c) | Weight loss (mg) |
|---|---|---|
| G | untreated | 12.3 |

Notes to Table 3
(a) is as defined in Notes to Table 1.
(c) BAO is 2-hydroxy-5-nonylbenzaldoxime.
3 PED/1 BAO is a mixture of PED and BAO in the weight ratio 3:1.
7 PED/1 BAO is a mixture of PED and BAO in the weight ratio 7:1.

EXAMPLES 7 TO 10

The procedure described in Example 1 was repeated with the exception that other additives were used. Further details, and the results obtained, are given in Table 4.

TABLE 4

| Example or Comp. Ex. | Additive (a)(d) | Weight loss (mg) |
|---|---|---|
| 7 | PEP | 0.3 |
| 8 | PEDEE | 4.6 |
| 9 | PETET | 3.8 |
| 10 | THP | 4.7 |
| H | Nil | 14.3 |

Notes to Table 4
(a) is as defined in Notes to Table 1.
(d) PEP is the polyester derivative obtained by the reaction of one mol of poly(12-hydroxyoctadecanoic acid) of molecular weight about 1600 (as determined by titration) with two mols of piperazine dihydrate and removing excess piperazine at the end of the reaction.
PEDEE is the polyester derivative obtained by the reaction of one mole of poly(12-hydroxyoctadecanoic acid) of molecular weight about 1600 (as determined by titration) with one mole of 2-diethyl-aminoethanol.
PETET is the polyester derivative obtained by the reaction of two mols of poly(12-hydroxyoctadecanoic acid) of molecular weight about 1600 (as determined by titration) with one mol of triethylene-tetraamine.
THP is the ester derivative obtained by reacting two mols of tallow alcohol with 1 mol of 12-hydroxyoctadecanoic acid to give an ester-containing product mixture which is reacted with phosphorus pentoxide in proportions to give 3 hydroxy groups from the ester-containing product mixture to one mol of phosphorus pentoxide.

EXAMPLES 11 AND 12

The procedure of Examples 2 and 3 was repeated using different additives. Further details, and the results obtained, are given in Table 5.

TABLE 5

| Example or Comp. Ex. | Additive (a)(d)(e) | Weight loss (mg) |
|---|---|---|
| 11 | PEAS | 3.9 |
| I | Untreated | 13.0 |
| 12 | PEDEE | 4.7 |
| J | Untreated | 10.9 |

Notes to Table 5
(a) is as defined in Notes to Table 1.
(d) is as defined in Notes to Table 4.
(e) PEAS is the polyester derivative obtained by the reaction of one mol of poly(12-hydroxyoctadecanoic acid) of molecular weight about 1600 (as determined by titration) with one mol of the sodium salt of 2-aminoethanesulphonic acid.

EXAMPLE 13

The procedure of Examples 4 to 6 was repeated with the exception that different additives were used and the treatment was effected using a 30% by weight solution of the additive in the hydrocarbon solvent. Further details, and the results obtained, are given in Table 6.

TABLE 6

| Example or Comp. Ex | Additive (f) | Coating wt (g.m$^{-2}$) | Weight loss (mg) |
|---|---|---|---|
| K | LA | 9.2 | 3.1 |
| 13 | LA/PED | 9.5 | 1.2 |

Notes to Table 6
(f) LA is a commercial grade of lanolin obtained from Westbrook Lanolin Company, Bradford, England.
LA/PED is a mixture of LA and PED (as defined) in a weight ratio of 5:1.

EXAMPLE 14

Cold rolled, mild steel panels (75×100 mm) were used in the as-received condition, with no pre-treatment, and treated as described in Example 3. After the coated panels had been allowed to dry, they were subjectd to a salt spray test in accordance with ASTM Test Method B 117 (1973). The panels were examined every day for rust. Further details, and the results obtained, are given in Table 7.

TABLE 7

| Example or Comp. Ex | Additive (f) | Rusting (h) Initial | Complete |
| --- | --- | --- | --- |
| L | LA | 1 | 6 |
| 14 | LA/PED | 9 | >21 |

Notes to Table 7
(f) is as defined in Notes to Table 6.
(h) Rusting is given in days to the first signs of rusting (Initial) and to the panel being totally covered in rust (Complete). Using the LA/PED mixture, the panel was still predominantly rust free after 21 days.

EXAMPLE 15

2 g of the polyester derivative (PED) used in Example 1 were shaken with 100 g of a proprietary nitrocellulose primer paint. A sample of this mixture was diluted with a further quantity of the nitrocellulose primer paint to give a final primer paint containing 1% w/w of PED. Samples of the nitrocellulose primer paint containing different levels of PED were drawn down coated onto ground cold rolled steel panels (7.6 cm×15.2 cm×0.08 cm) to give a coating with a dry thickness of 21±1 micrometers. The coatings were allowed to dry for nine days. The panels were edged and backed with adhesive tape. The exposed, coated surface was scribed with a vertical line, as specified in ASTM D 1654. The panels were then exposed for 14 days to alternating two hour periods of dry air at 35° C. and a salt mist formed from an aqueous solution containing 0.35 and 0.05 wt % of ammonium sulphate and sodium chloride respectively.

At the completion of the exposure, the edging and backing tapes were removed and the underfilm rusting assessed in accordance with ASTM D 610. Panels coated with paints containing 0, 1 and 2 wt % of PED showed underfilm rusting of 3, 4 and 10 respectively.

A duplicate set of panels were exposed to the salt spray test of ASTM B 117. The blister ratings, assessed according to ASTM D 714, were 5M, 8F and 10 for panels coated with paints containing 0, 1 and 2 wt % of PED respectively.

EXAMPLE 16

To a lithium base grease of lithium 12-hydroxyoctadecanoate in a 500 Pale Oil containing no additives was added 1% w/w of the polyester derivative (PED) of Example 1. This grease and a sample of the grease with no polyester additive were applied to bearings which were subjected to the IP dynamic anti-rust test for lubricating greases (IP 220) run with distilled water. The test was run for seven days and the bearings were then removed, cleaned and the outer ring tracks carefully examined for rust or etch spots. The additives used and the ratings achieved are set out in Table 8.

TABLE 8

| Example or Comp. Ex. | Additive (a) | Rating (i) |
| --- | --- | --- |
| 16 | PED | 0 |
| M | Nil | 2 |

Notes to Table 8
(a) is as defined in Notes to Table 1.
(i) The ratings are as follows:-
0 means no corrosion.
1 means not more than 3 small spots each just sufficient to be visible to the naked eye.
2 means small areas of corrosion up to 1% of the surface.

I claim:

1. A process for the inhibition of corrosion of metals by the treatment of a metal surface with a compound of the formula:

$$Y-CO-[O-A-CO]_n-Z-R \quad\quad I$$

or $$Y-O-[CO-A-O]_n-J \quad\quad Ia$$

wherein
A is a divalent hydrocarbon radical;
Y is a hydrogen atom, a hydrocarbon group, or a halogen, hydroxy, amino or alkoxy substituted hydrocarbon group;
n is an integer from 1 to 100;
Z is a divalent bridging group of the formula:

$$-NQ-L- \text{ or } -O-L-;$$

R is either
(i) an amino group or the salt thereof with an acid or
(ii) sulphonate, phosphonate, sulphate or phosphate in the free acid form or as a metal or ammonium salt;
J is phosphonate or sulphonate in the free acid form or as a metal or ammonium salt;
Q is a hydrogen atom or an alkyl group; and
L is an alkylene or hydroxyalkylene group; or
N, Q and L, together with the nitrogen atom in the group R to which they are attached, form a cycloaliphatic bridging group.

2. The process of claim 1 wherein the group Y is an optionally substituted alkyl group containing up to 25 carbon atoms.

3. The process of claim 2 wherein the group A is an alkylene or alkenylene group containing from 4 to 25 carbon atoms with at least 4 carbon atoms between the oxygen atom and carbonyl group.

4. The process of claim 3 wherein the compound of formula I or Ia is derived from a mixture of (i) a saturated or unsaturated aliphatic hydroxycarboxylic acid containing from 4 to 25 carbon atoms having at least 4 carbon atoms between the hydroxy and carboxy groups, or a cyclic precursor thereof, and (ii) an aliphatic carboxylic acid of the formula Y—COOH or an aliphatic alcohol of the formula Y—OH.

5. The process of claim 1 wherein the group R is of the formula:

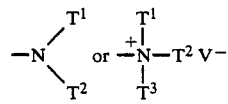

wherein $T^1$, $T^2$ and $T^3$ are each, independently, a hydrogen atom or an alkyl or cycloalkyl group which may be substituted by non-polar groups; and $V^-$ is an anion.

6. The process of claim 1 wherein the metal surface is treated with a mixture of a compound of Formula I or Ia in admixture with a compound of Formula III or IIIa respectively:

$$Y-CO-[O-A-CO]_n-OH \qquad III$$

$$Y-O-[CO-A-O]_n-H \qquad IIIa.$$

7. The process of claim 1 wherein the metal is iron, zinc, copper, tin or aluminium.

8. The process of claim 1 wherein the compound is applied to the metal surface as a solution in an organic solvent or in admixture with a surface coating composition wherein the solution or surface coating composition contains from 0.1 to 20% by weight of the compound of Formula I or Ia.

9. The process of claim 1 wherein the compound of Formula I or Ia is used together with another corrosion inhibitor.

10. A composition comprising
(A) an ester compound of the formula $$Y-CO-[O-A-CO]_n-Z-R \qquad I$$

or $$Y-O-[CO-A-O]_n-J \qquad Ia$$

and
(B) a hydroxy-oxime containing the moiety

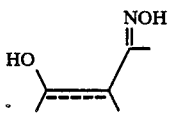

wherein
A is a divalent hydrocarbon radical;
Y is a hydrogen atom or an optionally substituted hydrocarbon group;
n is an integer from 1 to 100;
Z is a divalent bridging group;
R is either (i) an amino group or the salt thereof with an acid or (ii) sulphonate, phosphonate, sulphate or phosphate in the free acid form or as a metal or ammonium salt; and
J is phosphonate or sulphonate in the free acid form or as a metal or ammonium salt.

11. A surface coating composition which is a natural oil or grease, containing a compound of the formula:

$$Y-CO-[O-A-CO]_n-Z-R \qquad I$$

or $$Y-O-[CO-A-O]_n-J \qquad Ia$$

wherein
A is a divalent hydrocarbon radical;
Y is a hydrogen atom or an optionally substituted hydrocarbon group;
n is an integer from 1 to 100;
Z is a divalent bridging group;
R is either
(i) an amino group or the salt thereof with an acid or
(ii) sulphonate, phosphonate, sulphate or phosphate in the free acid form or as a metal or ammonium salt; and
J is phosphonate or sulphonate in the free acid form or as a metal or ammonium salt.

12. A process for the inhibition of corrosion of metals by the treatment of a metal surface with a compound of the formula:

$$Y-CO-[O-A-CO]_n-Z-R \qquad I$$

or $$Y-O-[CO-A-O]_n-J \qquad Ia$$

wherein
A is a divalent hydrocabon radical;
Y is a hydrogen atom, a hydrocarbon group or a halogen, hydroxy, amino or alkoxy substituted hydrocarbon group;
n is an integer from 1 to 100;
Z is a divalent bridging group of the formula:

$$-NQ-L- \text{ or } -O-L-$$

R is either
(i) an amino group or the salt thereof with an acid or
(ii) sulphonate, phosphonate, sulphate or phosphate in the free acid form or as a metal or ammonium salt;
J is phosphonate or sulphonate in the free acid form or as a metal or ammonium salt;
Q is a hydrogen atom or an alkyl group; and
L is an alkylene or hydroxyalkylene group; or
N, Q and L, together with the nitrogen atom in the group R to which they are attached, form a cycloaliphatic bridging group.

13. A metal having on the surface thereof a coating which is, or which contains, a corrosion inhibition quantity of a compound of the formula:

$$Y-CO-[O-A-CO]_n-Z-R \qquad I$$

or $$Y-O-[CO-A-O]_n-J \qquad Ia$$

wherein
A is a divalent hydrocarbon radical;
Y is a hydrogen atom, a hydrocarbon group or a halogen, hydroxy, amino or alkoxy substituted hydrocarbon group;
n is an integer from 1 to 100;
Z is a divalent bridging group of the formula:

$$-NQ-L- \text{ or } -O-L-$$

R is either
(i) an amino group of the salt thereof with an acid or
(ii) sulphonate, phosphonate, sulphate or phosphate in the free acid form or as a metal or ammonium salt;
J is phosphonate or sulphonate in the free acid form or as a metal or ammonium salt;
Q is a hydrogen atom or an alkyl group; and
L is an alkylene or hydroxyalkylene group; or
N, Q and L, together with the nitrogen atom in the group R to which they are attached, form a cycloaliphatic bridging group.

* * * * *